United States Patent [19]

White

[11] Patent Number: 5,703,596
[45] Date of Patent: Dec. 30, 1997

[54] DEMODULATING INTEGRATOR/ DEMULTIPLEXER

[75] Inventor: Stanley A. White, San Clemente, Calif.

[73] Assignee: Boeing North American, Inc., Seal Beach, Calif.

[21] Appl. No.: 691,766

[22] Filed: Aug. 2, 1996

[51] Int. Cl.[6] ............................................. G01S 7/30
[52] U.S. Cl. ..................................... 342/194; 342/195
[58] Field of Search ................................ 342/194, 195

[56] References Cited

U.S. PATENT DOCUMENTS 4,667,200  5/1987  Gellekink et al. ................ 342/194
5,369,411  11/1994  Lisle, Jr. ........................... 342/194

*Primary Examiner*—Daniel T. Pihulic
*Attorney, Agent, or Firm*—Charles T. Silberberg; Tom Streeter

[57] ABSTRACT

A radar digital IF (intermediate-frequency) signal is to be complex demodulated, then processed through a two-channel real lowpass filter, prior to Doppler correction, clutter filtering, and other usual processing steps. A particularly efficient form of lowpass filtering for such applications is the so-called CIC (cascaded integrator/comb) filter. The first stage of such a filter is always an integrator. A conventional mechanization would therefore feature a conventional complex demodulator followed by an accumulator on each of the two demodulator outputs, followed by more processing. This invention more efficiently mechanizes this function by replacing the usual pair of multipliers and pair of accumulators (or integrators) with a single two-delay (54, 58) accumulator having an add/subtract control (48) on the input adder (42), and a pair of multiplexer switches (62, 66).

8 Claims, 1 Drawing Sheet

5,703,596

DEMODULATING INTEGRATOR/DEMULTIPLEXER

This invention was made with Government support under Contract No. DAAH01-95-C-0021 awarded by the Army. The Government has certain rights in this invention.

BACKGROUND OF THE INVENTION

This invention relates to the complex baseband filtering of a radar digital IF (intermediate-frequency) signal (or radar DIF signal) of a radar receiver. The radar DIF signal is to be complex demodulated, then processed through a two-channel real lowpass filter, prior to Doppler correction, clutter filtering, and other usual processing steps. A particularly efficient form of lowpass filtering for such applications is the so-called CIC (cascaded integrator/comb) filter. The first stage of such a filter is always an integrator. A conventional mechanization would therefore feature a conventional complex demodulator followed by an accumulator on each of the two demodulator outputs, followed by more processing.

This invention deals with efficient mechanization of the combination of a complex demodulator and the first integration on each of the two signal paths.

SUMMARY OF THE INVENTION

Applicant has simplified the usual processing by replacing the usual pair of multipliers and pair of accumulators (or integrators) with a single two-delay accumulator having an add/subtract control on the input adder, and a pair of multiplexer switches.

DETAILED DESCRIPTION OF THE DRAWINGS

Figure 1:
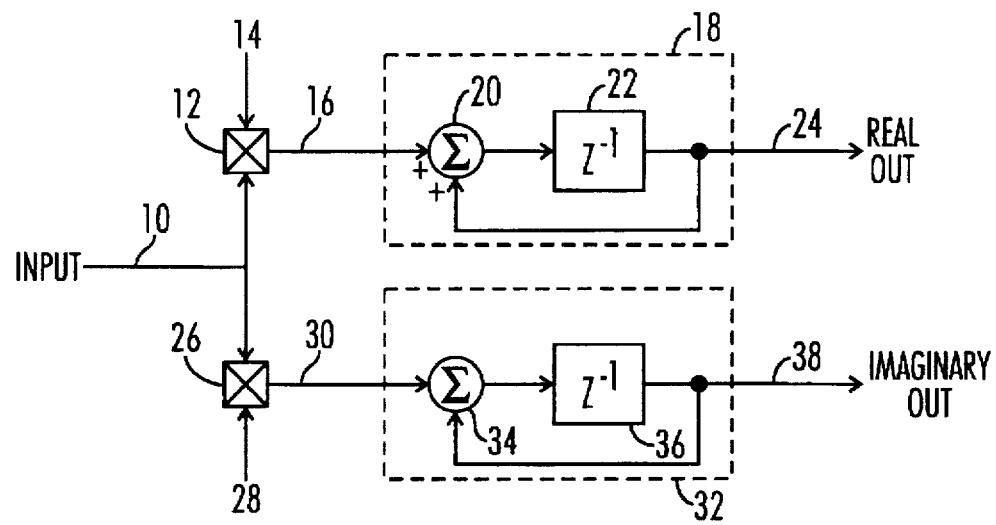
FIG. 1 is the schematic of the prior art.

FIG. 1 is the schematic of the prior art. In FIG. 1, the input 10, a radar DIF signal whose bandwidth is less than half the sampling frequency and whose frequency band is centered at a fourth of the sampling frequency, is applied to real multiplier 12 which generates real product 16 and whose other input 14 is the real part of the demodulation reference; and to the imaginary multiplier 26 which generates imaginary product 30 and whose other input 28 is the imaginary part of the demodulation reference.

The real product 16 is integrated by accumulator 18 comprising adder 20 which drives delay element 22 whose output 24 is the real part of the demodulated and integrated input. Adder 20 sums real product 16 and real output 24.

The imaginary product 30 is integrated by accumulator 32 comprising adder 34 which drives delay element 36 whose output 38 is the imaginary part of the demodulated and integrated input. Adder 34 sums imaginary product 30 and imaginary output 38.

Figure 2:
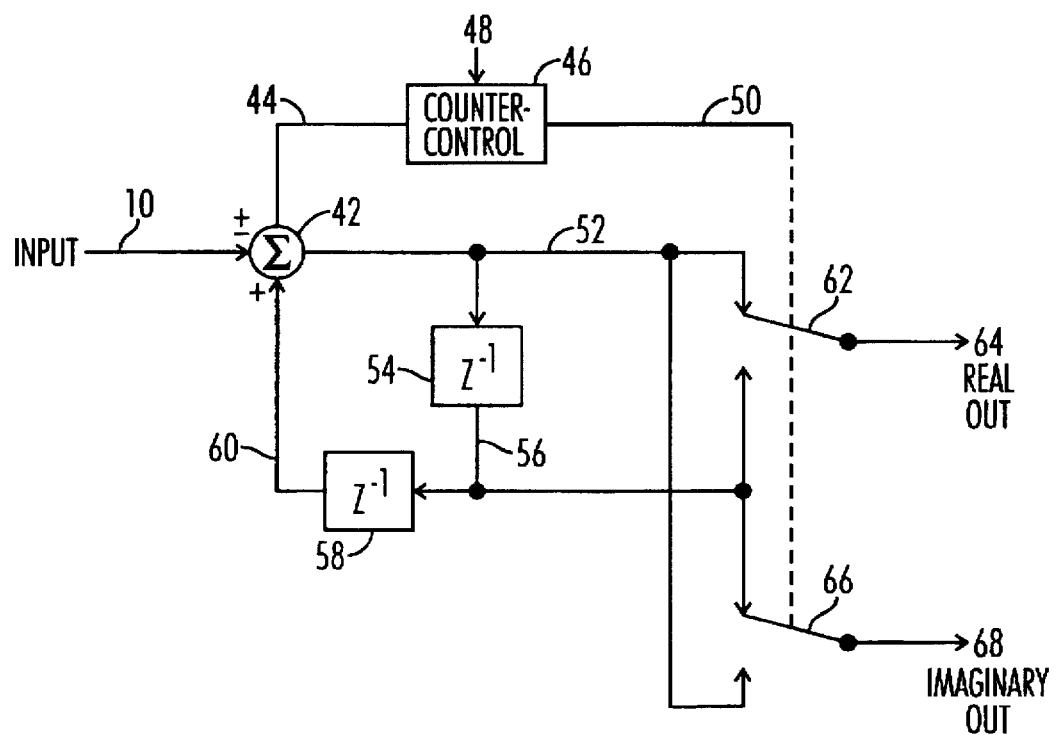
FIG. 2 is the schematic of the present invention.

FIG. 2 is a schematic of the present invention. In FIG. 2, a sampling dock signal 48 drives counter-control signal generator 46. Counter-control signal generator 46 generates an internal count, n, from which it produces a first control signal 44 and a second control signal 50. The input 10 (the radar DIF signal) is added to or subtracted from feedback signal 60 in the combiner 42 according to the state of the first control signal 44.

Combiner output 52 drives a first delay element 54 producing a first delayed output 56. The first delayed output 56 drives a second delay element 58 producing a second delayed output 60, which is the feedback signal to combiner 42.

Multiplexer switch 62 connects a real output terminal 64 to the combiner output when the second control signal is one; otherwise real output terminal 64 is connected to the first delayed output 56. Multiplexer switch 66 connects an imaginary output terminal 68 to the first delayed output 56 when the second control signal is one; otherwise imaginary output terminal 68 is connected to the combiner output.

In the preferred embodiment, the combiner 42 adds signal 10 to signal 60 when the first control signal 44 is one and subtracts signal 10 from signal 60 otherwise (that is, control signal 44 is zero). In this embodiment, counter 46 is a two-bit four-state counter. Thus, the first control signal 44 has a value of one when $\cos[(\pi/4)(2n+1)]>0$, and has a value of zero otherwise. First control signal 44 is the exclusive nor (EXNOR) of the least-significant-bit (LSB) and the most-significant-bit (MSB) outputs of the counter. Second control signal 50 has a value of one when n is odd, and has a value of zero otherwise. Second control signal 50 is the least-significant-bit (LSB) output of the counter.

SCOPE OF THE INVENTION

Although a specific embodiment of the present invention has been disclosed herein, the true spirit and scope of the present invention are not limited thereto. Such limitations are imposed only by the appended claims and their equivalents.

What is claimed is:

1. Apparatus for producing a complex-demodulated-and-integrated sampled radar signal from a sampled radar signal, wherein:

(a) the sampled radar signal has been generated by combining a radar signal and a sampling clock signal;

(b) the sampling clock signal has a sampling frequency;

(c) the sampled radar signal has a center frequency equal to a fourth of the sampling frequency, and has a bandwidth less than half the sampling frequency; and (d) the apparatus comprises:

(1) a counter-control signal generator connected to receive the sampling clock signal, and constructed to produce a first control signal and a second control signal;

(2) a combiner constructed to add the sampled radar signal to a feedback signal when the first control signal is one, and to otherwise subtract the sampled radar signal from the feedback signal, thereby producing a combiner output signal;

(3) a first delay element connected to receive the combiner output signal and constructed to thereby provide a first delayed output signal;

(4) a second delay element connected to receive the first delayed output signal and constructed to thereby provide a second delayed output signal, the second delayed output signal being the feedback signal;

(5) a first multiplexer switch constructed to output the combiner output signal when the second control signal is one and to output the first delayed output signal otherwise, an output signal from the first multiplexer switch being an in-phase component of the complex-demodulated-and-integrated sampled radar signal; and (6) a second multiplexer switch constructed to output the combiner output signal when the second control signal is zero and to output the first delayed output signal otherwise, an output signal from the second multiplexer switch being a quadrature component of the complex-demodulated-and-integrated sampled radar signal.

2. The apparatus of claim 1, wherein the first control signal is one when $\cos[(\pi/4)(2n+1)] > 0$ and is zero otherwise, where n is a count of pulses of the sampling clock signal.

3. The apparatus of claim 1, wherein the second control signal is one when n is odd and is zero when n is even, where n is a count of pulses of the sampling clock signal.

4. The apparatus of claim 2, wherein the second control signal is one when n is odd and is zero when n is even.

5. The apparatus of claim 1, wherein the counter is a two-bit four-state device.

6. The apparatus of claim 5, wherein the first control signal is an exclusive nor of a counter least-significant-bit (LSB) output and a counter most significant-bit (MSB) output.

7. The apparatus of claim 5, wherein the second control signal is a counter least-significant-bit (LSB) output.

8. The apparatus of claim 6, wherein the second control signal is a counter least-significant-bit (LSB) output.

* * * * *